C. HARTER.
ADJUSTABLE THRUST DEVICE FOR LOCOMOTIVE WHEELS.
APPLICATION FILED AUG. 30, 1918.
1,295,490.
Patented Feb. 25, 1919.
2 SHEETS—SHEET 1.
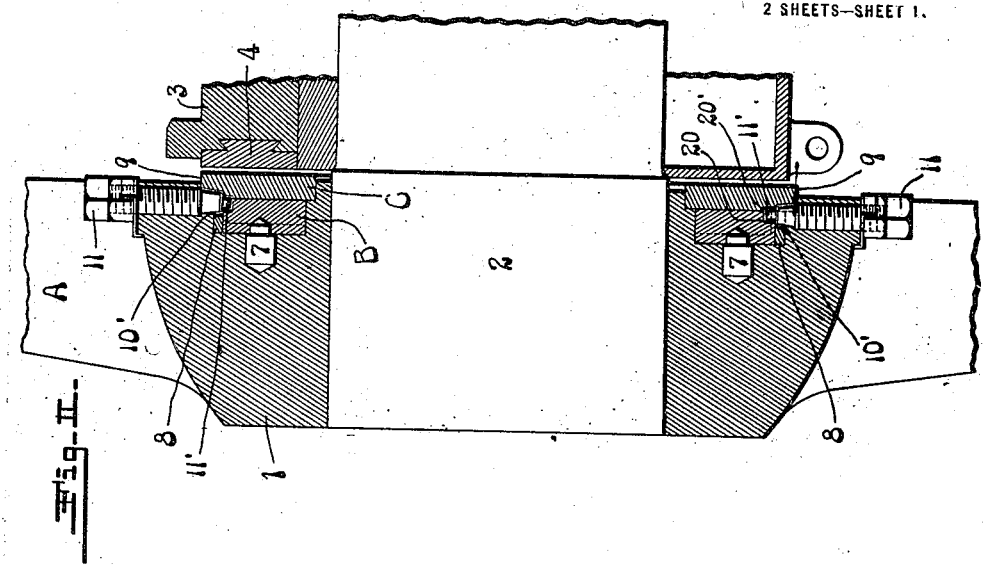
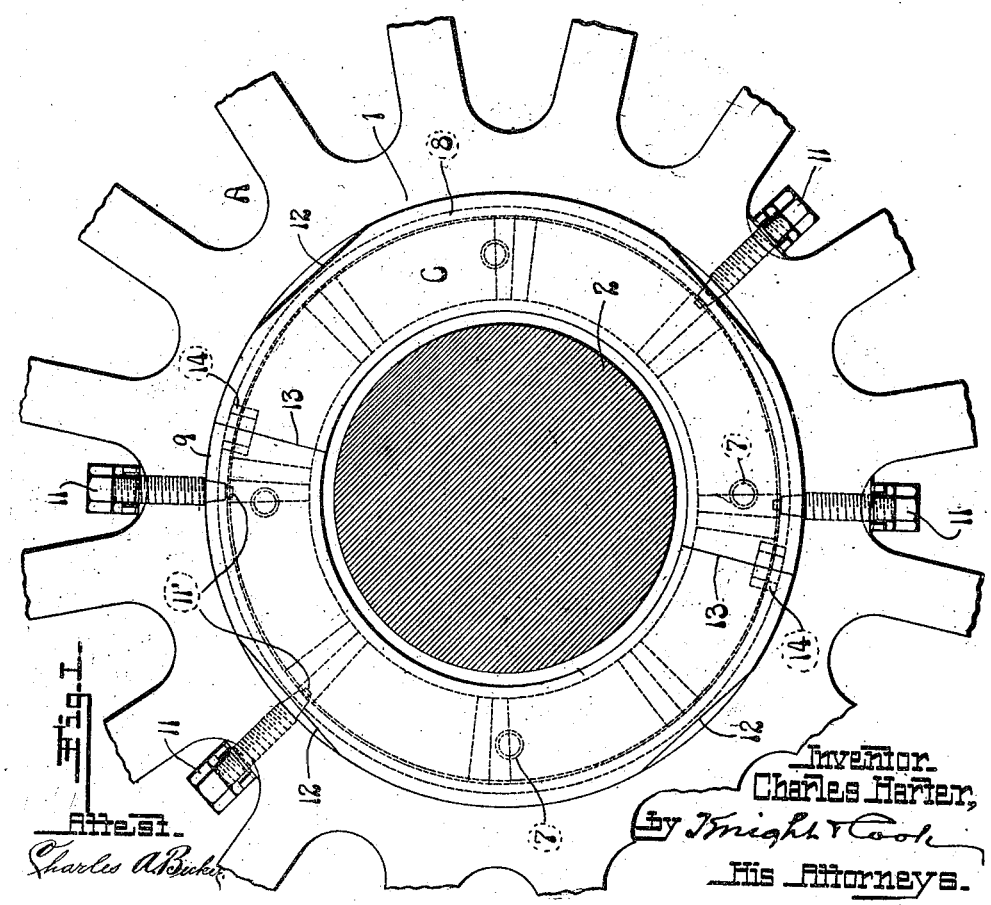
Inventor
Charles Harter,
by Knight & Cook
His Attorneys.

C. HARTER.
ADJUSTABLE THRUST DEVICE FOR LOCOMOTIVE WHEELS.
APPLICATION FILED AUG. 30, 1918.
1,295,490.
Patented Feb. 25, 1919.
2 SHEETS—SHEET 2.
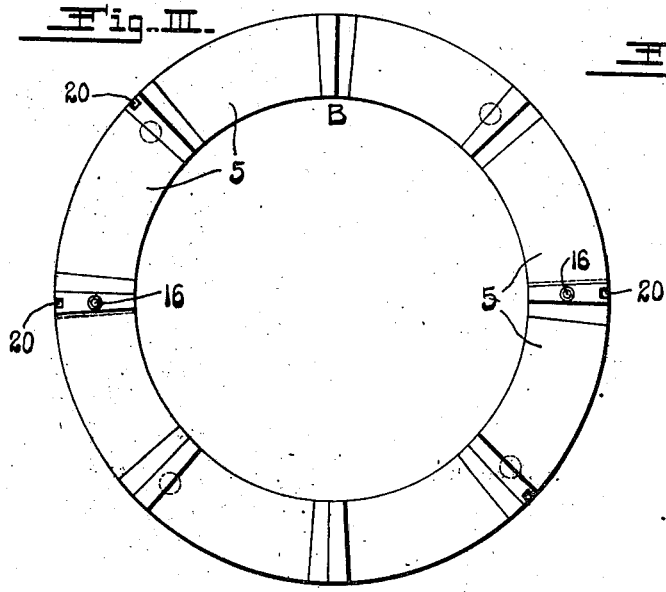
Fig. III.
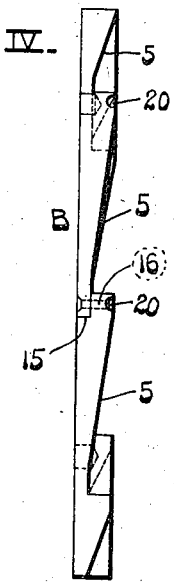
Fig. IV.
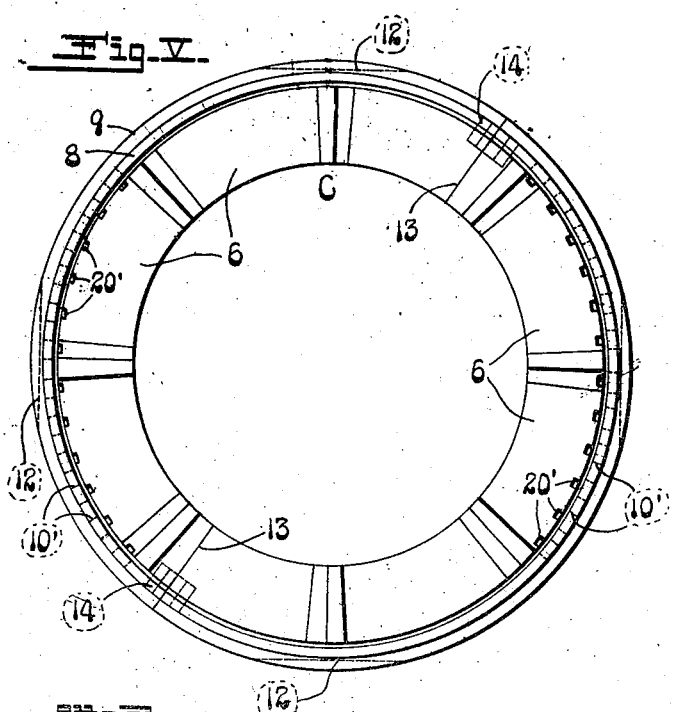
Fig. V.
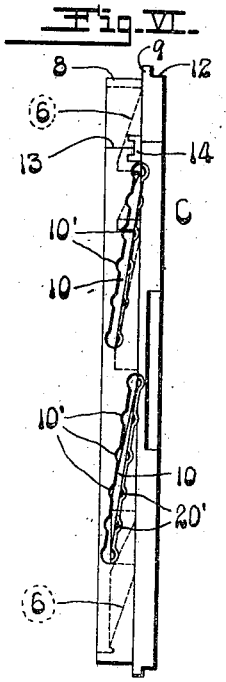
Fig. VI.
Attest.
Charles A. Becker
Inventor
Charles Harter,
By Knight & Cook
His Attorneys

UNITED STATES PATENT OFFICE.

CHARLES HARTER, OF ST. LOUIS, MISSOURI, ASSIGNOR OF ONE-HALF TO JOHN E. O'BRIEN, OF ST. LOUIS, MISSOURI.

ADJUSTABLE THRUST DEVICE FOR LOCOMOTIVE-WHEELS.

1,295,490.  Specification of Letters Patent.  Patented Feb. 25, 1919.

Application filed August 30, 1918. Serial No. 252,109.

*To all whom it may concern:*

Be it known that I, CHARLES HARTER, a citizen of the United States of America, a resident of the city of St. Louis, in the State of Missouri, have invented certain new and useful Improvements in Adjustable Thrust Devices for Locomotive-Wheels, of which the following is a full, clear, and exact description, reference being had to the accompanying drawings, forming a part of this specification.

This invention relates to improvements in adjustable thrust devices particularly adapted to prevent excessive lateral motion of locomotive bodies. The new devices are preferably adjustably mounted between the hubs of locomotive wheels and the adjacent axle-receiving boxes, and when so used they receive the thrusts due to lateral movements of the locomotive frame and body. The thrust devices serve as means for limiting the lateral movements, and they can be readily adjusted to prevent excessive lateral motion.

Owing to the friction between the rotating wheel hubs and the adjacent axle-receiving boxes, the wheel hubs, the boxes or some interposed elements are necessarily worn at the friction surfaces, and this gradually increases the space between each wheel hub and the adjacent box. As a consequence the lateral motion of the locomotive body is increased. The difference between the safe minimum and the safe maximum lateral motion is only about one-fourth of an inch, so it is frequently necessary to perform operations of some kind to prevent excessive lateral motion. The ordinary practice consists in securing a thrust ring, or hub plate, to the inner face of each wheel hub, and when the space for lateral motion at the ring reaches a predetermined maximum, the worn ring is either replaced by a new one, or a shim is placed between the old ring and the wheel hub. To perform either of these operations it is necessary to remove the wheels and axles from the locomotive. Obviously, this involves considerable time and labor, and usually necessitates the removal of the locomotive to a repair shop.

One of the objects of this invention is to provide a strong, simple and inexpensive means which can be easily and quickly adjusted to positively limit the lateral motion of the locomotive frame and body relative to the wheels. The necessary adjustment can be accurately made without removing the wheels and axles. A further object is to provide a simple means whereby the adjustable element of the thrust device is positively retained in the position to which it is adjusted.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

In the preferred form of the invention, an inner ring is mounted in the inner face of the wheel hub and prevented from turning independently of the wheel. An outer ring is fitted to said inner ring, and coöperating cams or inclines are formed at the contacting faces of the rings. The outer ring can be turned independently of the inner ring, with the result of moving said outer ring toward the axle box, and after the desired adjustment has been obtained the outer ring is securely locked and prevented from accidentally moving independently of the inner ring.

Figure I is a fragmentary view of a locomotive wheel, showing my adjustable thrust device applied to the inner face thereof.

Fig. II is a vertical section taken approximately through the center of the structure shown in Fig. I, and also showing a portion of the axle box, or driving box, adjacent to the wheel hub.

Fig. III is a detail view of the inner ring member of the thrust device.

Fig. IV is a side elevation, or edge view, of the ring member shown in Fig. III.

Fig. V is a detail view of the adjustable outer ring member.

Fig. VI is a side elevation, or edge view, of the ring member shown in Fig. V.

To illustrate the invention I have shown a locomotive wheel A having its hub 1 secured to an axle 2, the latter being mounted in an axle box, or driving box, 3 provided with a friction member 4 (Fig. II) facing the wheel hub.

The double thrust ring herein shown comprises an annular inner ring member B mounted in an annular recess in the wheel hub. The ring member B and the recess in which it is mounted are preferably concentric with the axis of the wheel. C designates an outer ring member interposed between the inner ring member and the axle box 3, said outer ring member having a friction face which opposes the friction member 4 on the axle box. Both ring members are preferably made of metal castings which may be finished to obtain the desired accuracy.

The inner ring member B is provided with an annular row of inclined, wedge-like cams 5, shown most clearly in Figs. III and IV, and the outer ring member C is provided with corresponding inclined cams 6 shown in Figs. V and VI. When the double thrust ring is assembled, as shown in Figs. I and II, the cams on the outer ring member engage the corresponding cams on the inner ring member, and the thrusts delivered to the double ring are transmitted through the cams. The cam faces of the different rings are always in contact with each other, and the outer ring may be turned with the result of adjusting its friction face toward the axle box.

To obtain the desired adjustment, the inner ring should be prevented from turning with the outer ring, and this may be accomplished through the medium of dowel pins 7 secured to the wheel hub and projecting into the inner ring B, as shown in Fig. II. The inner ring is thus detachably secured to the wheel hub and prevented from turning independently of the wheel. The outer ring C is provided with an inturned annular flange 8 surrounding the inner ring B and arranged in the annular recess in which the inner ring is mounted. The outer ring also has a peripheral flange 9 extending beyond the annular recess. Elongated slots, or openings, 10 (Fig. VI) formed in the flange 8 of the outer ring, are enlarged at intervals, as shown at 10′, to provide inclined rows of openings for the reception of locking screws 11 mounted in the wheel hub. When the locking screws 11 extend into the openings 10′, as shown in Fig. II, the outer ring C is locked to the wheel and prevented from turning independently of the inner ring. The locking screws also coöperate with the annular flange 8 to positively secure both ring members to the wheel hub.

It is important to observe that the inclination of the long slots 10 (Fig. VI) agrees with the inclination of the cams 6. Therefore, when the outer ring is turned on the cams of the inner ring, the slots 10 will remain in registration with the locking screws 11. The extreme inner end of each locking screw 11 is reduced as shown at 11′, and the diameter of this reduced end is slightly less than the width of the adjacent inclined slot 10.

In adjusting the outer ring, the first step consists in loosening the locking screws 11 to locate their reduced ends 11′ in the slots 10. The outer ring is then turned on the cam faces of the inner ring, and during this operation the reduced ends 11′, located in the elongated slots 10, secure the outer ring to the wheel and prevent it from accidentally moving away from the wheel hub. After the desired adjustment of the outer ring has been obtained, one of the enlarged portions 10′ of each inclined slot 10 will register with a locking screw 11, and the several screws are then tightened and projected into the adjacent enlargements 10′ so as to positively secure both ring members to the wheel, at the same time positively preventing the outer ring from turning independently of the inner ring. The cam faces of the inner and outer rings are preferably notched to receive the reduced ends 11′ of the locking screws, as shown in Fig. II. Single notches 20 are formed in the fixed inner ring, and rows of notches 20′ are formed in the adjustable outer ring.

When the double thrust ring is in service, it is securely attached to the wheel, and the thrusts are transmitted through the long cam faces which, as previously pointed out, are always in contact with each other. The double ring is therefore well adapted to resist the thrusts, and it is securely held in the position to which it is adjusted. Further, it can be very easily adjusted without removing the wheels and axles from the locomotive.

To facilitate the operation of turning the outer ring, the flange 9 of said ring may be provided with oppositely disposed flat portions 12 adapted to receive a wrench, or other suitable adjusting tool.

To enable the double ring to be applied to a wheel without removing the wheel from the axle, the outer ring member C is preferably split on the radial lines 13, so as to provide two semi-circular sections which may be readily mounted around the axle. Keys 14 are interlocked with the abutting end portions of these semi-circular sections, as shown in Figs. I, V and VI. These keys connect the two ring sections, and it will be observed that the semi-circular sections are also held in the desired relative positions through the medium of the flange 8 extending from the outer ring and surrounding the inner ring. The inner ring B (Figs. III and IV) preferably comprises two semi-circular sections lapped as shown at 15 and secured together by means of rivets 16.

I claim:

1. The combination with a wheel and an axle box adjacent thereto, of a double thrust ring comprising a ring member facing the axle box, a ring member facing the wheel hub, one of said ring members being adjustable away from the other, and means for retaining the adjustable ring member in the position to which it is adjusted, said means including thrust-receiving elements at the adjacent faces of the rings coöperating with each other to prevent one of the ring members from moving independently of the other.

2. The combination with a wheel and an axle box adjacent thereto, of a double thrust ring comprising a ring member facing the axle box, a ring member facing the wheel hub, one of said ring members being adjustable away from the other, and means for retaining the adjustable ring member in the position to which it is adjusted, said means including coöperating cams formed on the adjacent faces of the rings and locking means whereby one ring is prevented from turning independently of the other.

3. The combination with a wheel and an axle box adjacent thereto, of a double thrust ring comprising an outer ring member facing the axle box, an inner ring member facing the wheel hub, coöperating thrust-receiving cams formed at the opposing faces of said ring members to provide for the adjustment of the outer ring member toward said axle box, means for preventing the inner ring member from turning independently of the wheel, and adjustable means for preventing the outer ring member from turning independently of said inner ring member.

4. The combination with a wheel having a hub provided with an annular recess concentric to the axis of the wheel, and an axle box adjacent to said hub, of a double thrust ring comprising an inner ring member mounted in said annular recess and an outer ring member interposed between said inner ring member and the axle box, said outer ring member being provided with a friction face facing the axle box, and the adjacent opposing faces of the inner and outer ring members being provided with coöperating inclined cams which contact with each other to receive the thrusts transmitted through the double ring, said outer ring member and its cam face being rotatable relative to the inner ring member so as to adjust said friction face toward said axle box, adjustable locking means whereby said outer ring member is normally prevented from turning independently of said inner ring member, and means for preventing said inner ring member from turning independently of the wheel.

5. The combination with a wheel and an axle box adjacent thereto, of a double thrust ring comprising an outer ring member facing the axle box, an inner ring member facing the wheel hub, coöperating thrust-receiving cams formed at the opposing faces of said ring members to provide for the adjustment of the outer ring member toward said axle box, means for preventing the inner ring member from turning independently of the wheel, and a locking screw mounted in said wheel hub and coöperating with said outer ring member to prevent the latter from turning independently of said inner ring member.

6. The combination with a wheel and an axle box adjacent thereto, of a double thrust ring comprising an outer ring member facing the axle box, an inner ring member facing the wheel hub, coöperating thrust-receiving cams formed at the opposing faces of said ring members to provide for the adjustment of the outer ring member toward said axle box, means for preventing the inner ring member from turning independently of the wheel, and a locking screw mounted in said wheel hub and coöperating with said outer ring member to prevent the latter from turning independently of said inner ring member, said outer ring member being provided with a row of openings for the reception of a portion of said locking screw, thereby providing for a step by step adjustment of the outer ring member.

7. The combination with a wheel and an axle box adjacent thereto, of a double thrust ring comprising an outer ring member facing the axle box, an inner ring member facing the wheel hub, coöperating thrust-receiving cams formed at the opposing faces of said ring members to provide for the adjustment of the outer ring member toward said axle box, means for preventing the inner ring member from turning independently of the wheel, and a locking screw mounted in said wheel hub and coöperating with said outer ring member to prevent the latter from turning independently of said inner ring member, said outer ring member being provided with a row of openings for the reception of a portion of said locking screw, thereby providing for a step by step adjustment of the outer ring member, and said row of openings being formed in a line parallel with the faces of said cams.

8. The combination with a wheel and an axle box adjacent thereto, of a double thrust ring comprising an outer ring member facing the axle box, an inner ring member facing the wheel hub, coöperating thrust-receiving cams formed at the opposing faces of said ring members to provide for the adjustment of the outer ring member toward said axle box, means for preventing the inner ring member from turning independently of the wheel; and a locking screw mounted in said hub and coöperating with said outer ring member to prevent the latter from turning independently of said inner ring member, said locking screw having a reduced inner end and said outer ring member having an elongated slot for the reception of said reduced inner end, the elongated slot being enlarged at intervals to receive the locking screw whereby said outer ring member is locked to the hub.

9. The combination with a wheel and an axle box adjacent thereto, of a double thrust ring comprising an outer ring member facing the axle box, an inner ring member facing the wheel hub, coöperating thrust-receiving cams formed at the opposing faces of said ring members to provide for the adjustment of the outer ring member toward said axle box, dowels whereby said inner ring member is prevented from turning independently of the wheel hub, and adjustable locking screws carried by the wheel hub and coöperating with said outer ring member to prevent the latter from turning independently of said inner ring member.

10. The combination with a wheel having a hub provided with an annular recess concentric to the axis of the wheel, and an axle box adjacent to said hub, of a double thrust ring comprising an inner ring member mounted in said annular recess and an outer ring member interposed between said inner ring and the axle box, said outer ring member being provided with a friction face facing the axle box, and the adjacent opposing faces of the inner and outer ring members being provided with coöperating inclined cams which contact with each other to receive the thrusts transmitted through the double ring, said outer ring member and its cam face being rotatable relative to the inner ring member so as to adjust said friction face toward said axle box, a locking screw carried by the wheel hub and coöperating with said outer ring member to prevent the latter from turning independently of said inner ring member, said outer ring member being provided with a row of openings for the reception of said locking screw and said row of openings being formed in a line parallel with the contacting faces of said inclined cams, and means for preventing said inner ring member from turning independently of the wheel.

11. The combination with a wheel and an axle box adjacent thereto, of a thrust device comprising a thrust ring interposed between the wheel hub and axle box and having a friction face facing said axle box, said thrust ring also having a cam face and being rotatable independently of the wheel hub to provide for the adjustment of said friction face toward said axle box, and adjustable means normally preventing said thrust ring from turning independently of the wheel hub.

12. The combination with a wheel and an axle box adjacent thereto, of a thrust device comprising a thrust ring interposed between the wheel hub and axle box and having a friction face facing said axle box, said thrust ring and the wheel hub being provided with coöperating cams contacting with each other to provide for the adjustment of said thrust ring toward the axle box, and adjustable retaining means for preventing said thrust ring from turning independently of the wheel hub.

13. A wheel provided with a double thrust ring comprising an inner ring member facing the wheel hub, an outer ring member, said ring members being provided with coöperating cams providing for the adjustment of the outer ring member away from the wheel hub, and means for locking the outer ring member in the position to which it is adjusted.

14. A wheel provided with a thrust device comprising a double thrust ring having an inner ring member facing the wheel hub, an outer ring member, the adjacent faces of said ring members being provided with contacting thrust-receiving cams and the outer ring member being rotatable on the cam face of the inner ring member to provide for the adjustment of said outer ring member away from the wheel hub, means for preventing the inner ring member from turning independently of the wheel hub, and adjustable means for locking the outer ring member to prevent it from turning independently of the inner ring member.

15. The combination with a wheel having a hub provided with an annular recess concentric to the axis of the wheel, and an axle box adjacent to said hub, of a double thrust ring comprising an inner ring member mounted in said annular recess and an outer ring member interposed between said inner ring member and the axle box, said outer ring member being provided with a friction face facing the axle box, and the adjacent opposing faces of the inner and outer ring members being provided with coöperating inclined cams which contact with each other to receive the thrusts transmitted through the double ring, said outer ring member and its cam face being rotatable relative to the inner ring member so as to adjust said friction face toward said axle box, adjustable locking means whereby said outer ring member is normally prevented from turning independently of said inner ring member, and means for preventing said inner ring member from turning independently of the wheel, and each of said ring members being made of separate arcuate sections arranged to form a complete ring.

In testimony that I claim the foregoing I hereunto affix my signature.

CHARLES HARTER.